US011100302B2

(12) United States Patent
Bonner et al.

(10) Patent No.: US 11,100,302 B2
(45) Date of Patent: Aug. 24, 2021

(54) SYSTEM AND METHOD FOR VERIFICATION OF DISPLAYED SHELF TAGS USING HAND-HELD DEVICE

(71) Applicant: Sunrise R&D Holdings, LLC, Cinicinnati, OH (US)

(72) Inventors: Brett Bracewell Bonner, New Richmond, OH (US); Kevin Robert Fessenden, Milford, OH (US); Titus Arthur Jones, Hebron, KY (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 55 days.

(21) Appl. No.: 16/101,850

(22) Filed: Aug. 13, 2018

(65) Prior Publication Data
US 2020/0050813 A1 Feb. 13, 2020

(51) Int. Cl.
*G06K 7/14* (2006.01)
*H04W 4/029* (2018.01)
(Continued)

(52) U.S. Cl.
CPC ............ *G06K 7/1413* (2013.01); *G06F 9/542* (2013.01); *G06K 7/10881* (2013.01);
(Continued)

(58) Field of Classification Search
CPC ........ G06Q 10/00; G06Q 10/04; G06Q 10/06; G06Q 10/08; G06K 9/00
(Continued)

(56) References Cited

U.S. PATENT DOCUMENTS 5,241,467 A 8/1993 Failing et al.
5,493,107 A * 2/1996 Gupta .................... G06K 1/121
235/383
(Continued)

FOREIGN PATENT DOCUMENTS

WO 97/05556 2/1997

OTHER PUBLICATIONS

International Search Report & Written Opinion of the International Searching Authority dated Nov. 8, 2019 issued in corresponding International Patent Application No. PCT/US2019/046146 (13 pgs.).

(Continued)

*Primary Examiner* — Olusegun Goyea
(74) *Attorney, Agent, or Firm* — Pillsbury Winthrop Shaw Pittman, LLP

(57) ABSTRACT

A system and method for verifying price and product information displayed on tags for products on a shelf in a retail store. A retailer management server stores data relating to products including stored prices for the products and planogram information, for example. A hand-held portable terminal is configured to communicate with the server and verify data on a shelf tag. The terminal includes a scanner for scanning barcodes/UPCs/GTINs on a shelf tag associated with a product of a manufacturer, as well as the barcode on the product. The system processes and compares the scanned information of the shelf tag, including price information and optionally location data, with stored information for the product as obtained from the server, and issues an alarm (sound or vibration) from the hand-held device if the compared data is incorrect or inconsistent (i.e., not the same). Further, the system is configured to automatically print a new shelf tag with a barcode and stored price as a result of determining an inconsistency.

20 Claims, 7 Drawing Sheets

(51) Int. Cl.
    *H04W 4/35*     (2018.01)
    *G06F 9/54*     (2006.01)
    *G06K 7/10*     (2006.01)
    *G06Q 10/08*     (2012.01)

(52) U.S. Cl.
    CPC .......... *G06Q 10/087* (2013.01); *H04W 4/029* (2018.02); *H04W 4/35* (2018.02); *G06K 2007/10504* (2013.01)

(58) Field of Classification Search
    USPC ................................ 705/22, 28, 20; 235/385
    See application file for complete search history.

(56) References Cited

U.S. PATENT DOCUMENTS

| | | | | |
|---|---|---|---|---|
| 7,949,568 | B2* | 5/2011 | Fano | G06Q 20/203 705/22 |
| 8,009,864 | B2* | 8/2011 | Linaker | G06K 9/00664 382/103 |
| 8,049,621 | B1* | 11/2011 | Egan | G06Q 20/208 340/572.1 |
| 8,050,984 | B2 | 11/2011 | Bonner et al. | |
| 8,189,855 | B2* | 5/2012 | Opalach | G06K 9/00201 382/100 |
| 8,505,984 | B2 | 8/2013 | Henderson et al. | |
| 8,630,924 | B2* | 1/2014 | Groenevelt | G06Q 10/087 705/28 |
| 9,703,179 | B2 | 7/2017 | Bonner et al. | |
| 10,339,579 | B2* | 7/2019 | Bonner | G06Q 30/0261 |
| 2003/0216969 | A1* | 11/2003 | Bauer | H01Q 7/00 705/22 |
| 2007/0262142 | A1 | 11/2007 | Whitehouse et al. | |
| 2008/0077511 | A1* | 3/2008 | Zimmerman | G06Q 10/00 705/28 |
| 2009/0063307 | A1* | 3/2009 | Groenevelt | G06Q 10/087 705/28 |
| 2009/0094140 | A1* | 4/2009 | Kwan | G06Q 10/087 705/28 |
| 2010/0121663 | A1 | 5/2010 | Valeriano | |
| 2010/0201488 | A1* | 8/2010 | Stern | G06K 7/0008 340/10.1 |
| 2011/0011936 | A1 | 1/2011 | Morandi et al. | |
| 2011/0163160 | A1* | 7/2011 | Zini | G05D 1/0246 235/385 |
| 2013/0300729 | A1* | 11/2013 | Grimaud | G06T 7/001 345/419 |
| 2014/0144986 | A1* | 5/2014 | Forster | G06Q 10/087 235/385 |
| 2017/0177172 | A1* | 6/2017 | Graham | G06Q 30/0643 |
| 2017/0177195 | A1* | 6/2017 | Findlay | G06K 9/22 |
| 2017/0178060 | A1* | 6/2017 | Schwartz | G06K 9/6267 |
| 2017/0185951 | A1* | 6/2017 | Kawashima | G06Q 10/087 |
| 2017/0285449 | A1 | 10/2017 | Bonner et al. | |
| 2017/0286773 | A1* | 10/2017 | Skaff | G06N 3/0454 |
| 2018/0060804 | A1* | 3/2018 | Cheruku | G06K 9/4661 |
| 2018/0247264 | A1* | 8/2018 | Taylor | G06Q 10/047 |

OTHER PUBLICATIONS

International Preliminary Report on Patentability dated Feb. 25, 2021, issued in corresponding International Patent Application No. PCT/US2019/046146 (9 pgs.).

\* cited by examiner

SYSTEM AND METHOD FOR VERIFICATION OF DISPLAYED SHELF TAGS USING HAND-HELD DEVICE

BACKGROUND

Field

The present disclosure is generally related to a scanning and price verification system for shelf tags that are displayed for products, using a hand-held device, and a method of using the same, in a retail store.

Description of Related Art

Currently store personnel perform manual price checks by using a hand-held tool to read a Universal Product Code (UPC) or other code on the price tag affixed to the shelf that publishes or displays the product price to consumers. The hand-held typically includes a reader that scans the UPC and then displays on a screen of the hand-held the stored price for the product. As such, to ensure that the displayed price matches the stored price in the system, which would also be the price at checkout, the user has to visually compare the price displayed on the hand-held with the price printed on the tag. This may be particularly problematic at the beginning and conclusion of promotional windows. This tends also to be time-consuming and prone to error based on, e.g., user's fatigue, distractions, and/or simply not spending the necessary time and having attention to detail to do an audit correctly.

In addition, the only information that is typically conveyed to the user via the hand-held after scanning a UPC or code is the price associated with that code.

SUMMARY

It is an aspect of this disclosure to provide a method verifying prices displayed on tags and locations for products on a shelf that are carried by a retailer or a store. The method includes: scanning, by a hand-held, portable terminal, a tag barcode provided on a tag affixed to a shelf of the retailer or store, the tag being associated with a product of a manufacturer and the tag barcode comprising: an encoded identifier and price information for the associated product embedded therein; determining, via the retailer management server, the product associated with the scanned tag barcode; obtaining, via the retailer management server, a stored price associated with the determined product; comparing, at the retailer management server, the stored price associated with the determined product to the price information of the scanned tag barcode and determining an inconsistency between the stored price and the price information based on the comparison; communicating the determined inconsistency from the retailer management server to the hand-held, portable terminal; issuing an alert, using the hand-held, portable terminal, as a result of the determined inconsistency; issuing a command, as a result of the determined inconsistency, from the retailer management server to a printer to print a new shelf tag including a new tag barcode comprising: the encoded identifier and the stored price; and printing the new shelf tag using the printer. The alert is provided in the form of (a) an audio alarm via a sound device and/or (b) vibrations via a vibration device, that is within the hand-held portable terminal.

In an embodiment, location data of the product and/or hand-held portable terminal and stored planogram data may also be compared, an alert may be issued as a result of an inconsistency or error based upon the comparison.

Another aspect provides a system that includes a retailer management server with data storage; a communication network; a hand-held, portable terminal; and a printer. The data storage of the retail management server includes data related to products including stored prices for the products. The hand-held, portable terminal includes: a scanner for scanning a tag barcode provided on a tag affixed to a shelf of a retailer or store, the tag being associated with a product of a manufacturer and the tag barcode comprising: an encoded identifier and price information for an associated product embedded therein, a processor for processing, sending, and receiving data to and from the retailer management server, an alarm system comprising a sound device and/or a vibration device, a display, and a sound device and/or a vibration device contained therein. a printer for printing tags for shelves for the retailer or store; The hand-held portable terminal and the retailer management server are configured to communicate via the communication network. The hand-held portable terminal is configured to issue an alert provided in the form of (a) an audio alarm via the sound device and/or (b) vibrations via the vibration device as a result of a determination that a price on the tag affixed to the shelf obtained via the tag barcode scanned by the scanner is inconsistent with a stored price for the associated product obtained via the data storage from the retailer management server. Also, the printer is further configured to automatically print a new shelf tag including a new tag barcode comprising: the encoded identifier and the stored price, as a result of the determination.

Yet another aspect of this disclosure includes a method of verifying prices displayed on tags and locations for products on a shelf that are carried by a store, using a server. The method includes: receiving information from a scanned shelf tag, the received information including an encoded identifier and price information associated with a barcode as displayed via the scanned shelf tag for a product provided on a shelf in the store; determining the product associated with the received information; obtaining, from a database, a stored price associated with the determined product; comparing the stored price to the price information of the scanned shelf tag and determining an inconsistency between the stored price and the price information based on the comparison; communicating the determined inconsistency to a hand-held, portable terminal in order to issue an alert to an end user in the store; issuing a command, as a result of the determined inconsistency, to a printer to print a new shelf tag including a new tag barcode comprising: the encoded identifier and the stored price; and printing the new shelf tag using the printer.

Still yet another aspect of this disclosure is a method of verifying prices displayed on tags and locations for products on a shelf that are carried by a retailer or a store, using a hand-held portable terminal comprising a display. The method includes: scanning, by the hand-held, portable terminal, a tag barcode provided on a tag affixed to a shelf of the retailer or store, the tag being associated with a product of a manufacturer and the tag barcode including: an encoded identifier and price information for the associated product embedded therein; scanning a Global Trade Item Number (GTIN) or a Universal Product Code (UPC) of the product of the manufacturer; receiving a stored price associated with the GTIN or UPC of the product from a store server; comparing, at the portable terminal, the stored price to the price information of the scanned tag barcode and determining an inconsistency between the stored price and the price information based on the comparison; issuing an alert, using the hand-held, portable terminal, as a result of the determined inconsistency; issuing a command, as a result of the determined inconsistency, from the portable terminal to a printer to print a new shelf tag including a new tag barcode including: the encoded identifier and the stored price; and printing the new shelf tag using the printer. The alert is provided in the form of (a) an audio alarm via a sound device and/or (b) vibrations via a vibration device, that is within the hand-held portable terminal.

Other aspects, features, and advantages of the present disclosure will become apparent from the following detailed description, the accompanying drawings, and the appended claims.

BRIEF DESCRIPTION OF THE DRAWINGS

The present disclosure will be more readily understood from a detailed description of some example embodiments taken in conjunction with the following figures in which.

DETAILED DESCRIPTION OF THE PREFERRED EMBODIMENT(S)

Figure 1:
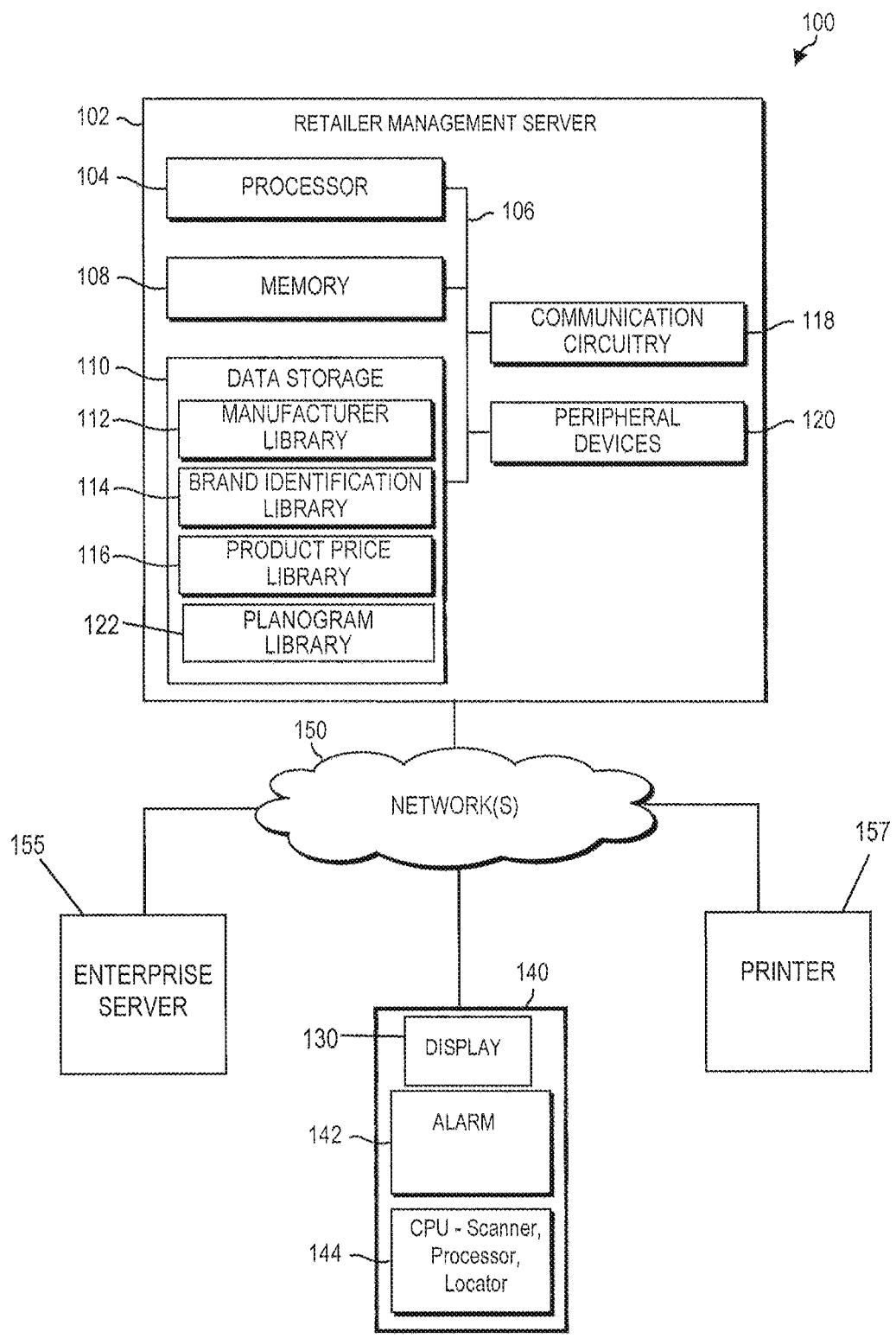
FIG. 1 is a simplified block diagram of one embodiment of a system for verifying product prices of shelf tags, location of products, and other related information.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. may be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically may be grouped together to perform a function or group of related functions. Like reference numerals are generally intended to refer to the same or similar components. Components and modules may be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein may be applied to, or easily modified for use with, other types of equipment, may use other arrangements of computing systems such as client-server distributed systems, and may use other protocols, or operate at other layers in communication protocol stacks, than are described.

This disclosure provides a two-fold solution to address problems associated with a user needing to visually compare prices displayed on the hand-held with the price on the tag and confirm information for correctly auditing inventory and price checks at a retail location. First, rather than only requiring visual inspection, the hand-held tool is configured to issue an alarm (e.g., make a noise or vibrate) when a price associated with a scanned, display tag (e.g., a printed paper tag attached or affixed to a shelf, a bib tag, etc.) for a product does not match a stored price for that product (e.g., the point of sale (POS) price associated with the product's code (e.g., UPC code) on the package (the price when scanned, e.g., by a checkout scanner)). As such, the user may scan and continue to scan codes/prices associated with displayed shelf tags, and optionally the barcodes on the products themselves, and assume accuracy between a scanned price associated with the shelf tag and the stored system (POS) price for the product, until a time that the hand-held issues an alarm, thereby signaling to or alarming the user of an inconsistency or error. As a result of the inconsistency or error, a new shelf tag may be automatically printed to replace the scanned tag for that product. Second, additional information, such as planogram information correlating to the scanned code, i.e., in addition to and beyond just price, may be relayed to the user (e.g., via a display on the hand-held). As such, as the user scans, the hand-held also determines, in real-time, if a location of the shelf price tag being scanned for a particular product (or the location of the product itself) matches the planogram stored in the system.

As generally understood by one of skill in the art, a UPC code, which is a twelve digit code, is part of a data system referred to as GTIN (Global Trade Item Number). Accordingly UPC codes may also be referred to as GTIN codes. UPC and GTIN codes are generally provided as a barcode on a product. These codes indicate a manufacturer and an identification (ID) number, for example, for a specific product. A Universal Product Number, or UPN, may be another code that is provided on a product, e.g., in the form of a barcode. There are also other types of barcodes used outside of the United States on products, such as thirteen digit EAN numbers. For explanatory purposes only, this disclosure references use of UPC and GTIN codes. However, use of such codes is not intended to limit the disclosed method or system to using these specific types of codes or specifically, one-dimensional bar codes. Rather, any number or type of electronic product codes may be used, including, for example, two-dimensional codes such as product QR codes and datamatrix codes, for example. Nonetheless, the terms code and barcode may be used interchangeably throughout this disclosure for descriptive purposes only. The barcodes on shelf tags may include the UPC/GTIN/codes of the products thereon, along with, e.g., an encoded identifier embedded therein.

Referring now to the Figures, FIG. 1 is one embodiment of a system 100 for identifying product prices and related information, in accordance with this disclosure. The system 100 includes a retailer management server 102 configured to communicate with one or more electronic, portable, wireless terminals 140 (also referred to as "portable terminal 140" or "hand held 140") or hand-held tools or devices for an end user, connected over one or more computing networks 150. In this case, the retailer management server 102 may be a system or server located at a particular retail store location, and the end user of a portable terminal 140 may be a store clerk, personnel, or employee that is tasked with scanning shelf tags affixed to shelves in the retail store. The system 100 may also include an enterprise server 155 and a printer 157. The enterprise server 155 may be a system or server associated with an enterprise, a corporation, or other business, i.e., "retailer", that communicates with multiple retailer management servers, for example. For purposes of this disclosure, "retailer" refers to the enterprise, whereas "store" refers to a particular retailer location, selling products offered by the retailer. Also, use of the word "server" is not intended to be limiting; rather, reference to a server may also refer to a computer system that may be implemented as one or more computing devices, such as—but not limited to—server computers, personal computers, mobile computing devices, and the like. Furthermore, the schematic representation of the server 102 and enterprise server 155 are not intended to limit the servers or systems to a single piece of hardware. For example, in some embodiments, the retailer management server 102 and enterprise server 155 may be implemented as a plurality of computing devices interconnected by a network. The printer 157 of the system may be a local printer, e.g., in the store, or a printer provided at a retailer, remote printing company or service. Further details regarding the printer 157 are described later.

Generally, the retailer management server 102 contains a list of active codes (e.g., universal product codes (UPCs)) for products sold by a retailer and/or available in a store, for example. The active codes/UPCs may be indicative of the products sold by the retailer during the normal course of business. Further, associated with these codes are prices set by the retailer for such products.

The retailer management server 102 may be embodied as any type of server or computing device capable of processing, communicating, storing, maintaining, and transferring data. For example, the retailer management server 102 may be embodied as a server and/or a device that communicates with a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In the illustrative embodiment of FIG. 1, the retailer management server 102 includes a processor 104 (or controller), a system bus 106, a memory 108, a data storage 110 (or database), communication circuitry 118, and one or more peripheral devices 120. Of course, the server 102 may include other and/or additional components, such as those commonly found in a server and/or computer (e.g., various input/output devices), in other embodiments. Additionally, in some embodiments, one or more of the illustrative components may be incorporated in, or otherwise from a portion of, another component. For example, the memory 108, or portions thereof, may be incorporated in the processor 104 in some embodiments. Furthermore, it should be appreciated that the server 102 may include other components, sub-components, and devices commonly found in a computer and/or computing device, which are not illustrated in FIG. 1 for clarity of the description.

The processor 104 may be embodied as any type of processor or controller capable of performing the functions described herein. For example, the processor 104 may be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or any other type of processor or processing/controlling circuit or controller.

In various configurations, the retailer management server 102 includes a system bus 106 for interconnecting its various components. The system bus 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 104, the memory 108, and other components of the server 102. In some embodiments, the retailer management server 102 may be integrated into one or more chips such as a programmable logic device or an application specific integrated circuit (ASIC). In such embodiments, the system bus 106 may form a portion of a system-on-a-chip (SoC) and be incorporated, along with the processor 104, the memory 108, and other components of the retailer management server 102, on a single integrated circuit chip.

The memory 108 may be embodied as any type of volatile or non-volatile memory or data storage capable of performing the functions described herein. For example, the memory 108 may be embodied as read only memory (ROM), random access memory (RAM), cache memory associated with the processor 104, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 108 may store various data and software used during operation of the retailer management server 102 such as operating systems, applications, programs, libraries, and drivers.

The data storage 110 or database includes one or more storage devices that maintain information related to products offered for sale by a retailer or a store, including current pricing information for each product. That is, the POS or sale price for each product may be stored in the data storage 110. As needed, e.g., during a particular day(s) of the week or month, the prices may be updated, for example. In an embodiment, the retail management server 102 may receive, e.g., via network 150, updated pricing information, product information, stock information, etc. via an enterprise server 155 of the retailer. Such information may be periodically downloaded, for example, over the network 150, and stored locally in the data storage 110 of the store. In another embodiment, updated pricing information, product information, etc. may be updated locally, i.e., by a manager or via a local disc or electronic device provided at the store, which communicates with the server 102 to update the data storage 110.

The data storage 110 may be embodied as any type of device or devices configured for short-term or long-term storage of data such as, for example, memory devices and circuits, memory cards, hard disk drives, solid-state drives, or other data storage devices. For example, in some embodiments, the data storage 110 includes storage media such as a storage device that may be configured to have multiple modules, such as magnetic disk drives, floppy drives, tape drives, hard drives, optical drives and media, magneto-optical drives and media, compact disc drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 104, or the memory 108 are also contemplated as storage devices. It should be appreciated that such memory may be internal or external with respect to operation of the disclosed embodiments. It should also be appreciated that certain portions of the processes described herein may be performed using instructions stored on a computer-readable medium or media that direct or otherwise instruct a computer system to perform the process steps. Non-transitory computer-readable media, as used herein, comprises all computer-readable media except for transitory, propagating signals.

In some embodiments, the data storage 110 includes libraries for maintaining information related to products in the retail store. For example, in an embodiment, such as illustrated in FIG. 1, the data storage 110 may include a manufacturer library 112, a brand identification library 114, a product price library 116, and a planogram library 122, for example. It should be appreciated that the data storage 110 may include other and/or alternate libraries, in other embodiments. The manufacturer library 112 may include one or more codes, such as GTINs or UPCs. Each GTIN or UPC or code of the manufacturer library 112 may be associated with a manufacturer name and ID number, or other data, that identifies the manufacturer of the product for which the UPC corresponds. The brand identification library 114 may include one or more brands or brand identifiers. Each brand of the brand identification library 114 may be associated with a manufacturer name or other data that identifies the manufacturer that owns or controls that brand. In addition, either or both libraries 112 and/or 114, or another designated library (not shown), may retain product information associated with an encoded identifier provided in a barcode on a shelf tag (e.g., a printed, paper tag). Shelf tags include a tag barcode that has an encoded identifier, or batch ID, and price information for a product embedded therein. The encoded identifier of the tag barcode corresponds to a file associated with the determined product. When the tag barcode is scanned, the encoded identifier may be identified by the server 102 in order to send its file to the printer, before the printing of the new shelf tag. In an embodiment, the encoded identifier may be the last three digits of a product UPC code; these last three digits may be looked up or references in an associated file saved in the server 102, for example, to determine the file and tag details (e.g., pricing information).

The product price library 116 may include pricing information for a product associated with the GTIN, UPC, or other code for a product of the manufacturer. More specifically, pricing information maintained and stored in the product price library 116 includes a current point-of-sale (POS) price for each product as set by the retailer, such that, when the barcode of a product is scanned at the checkout counter, the price is obtained from the product price library 116. The POS prices associated with each GTIN/UPC code of product may be periodically updated and/or changed, e.g., depending on offers or promotions being offered by the store or retailer. These POS prices are updated and saved in the library 116 or data storage 110, for example, as they are updated. Accordingly, when a code (GTIN, UPC) is scanned, e.g., at checkout, the current POS price is accessed.

In addition, in accordance with an embodiment, the product price library 116 may store and include one or more strings that include all or portions of product descriptions. Each string may be associated with a particular product and the brand corresponding to that product. Alternatively, in another embodiment, a separate library (not shown) may be provided as part of data storage 110 for storing product descriptions.

Similarly, in either the product price library 116 or another separate library (not shown), data and pricing information associated with barcodes on shelf tags may be retained. For example, each barcode of a tag has an encoded identifier as well as price information for an associated product embedded therein. When the barcode of the tag is scanned, the particular price associated with that tag and code may be obtained from the library or database. That is, the price information of the barcode on the shelf tag is a set price that does not change and is not updated in the database/library. Accordingly, the price information of the barcode on the tag will not change, while the POS price associated with the barcode on a product, i.e., the GTIN/UPC code, may change. In an embodiment, for example, the price information or set price may be a sale price during a promotion being offered by the store or retailer during a predetermined time period. The tag may display (in print) this sale price thereon. The system and method disclosed herein is configured, in an embodiment, to compare the price associated with the shelf tags to the POS price, to ensure accuracy.

Figure 2:
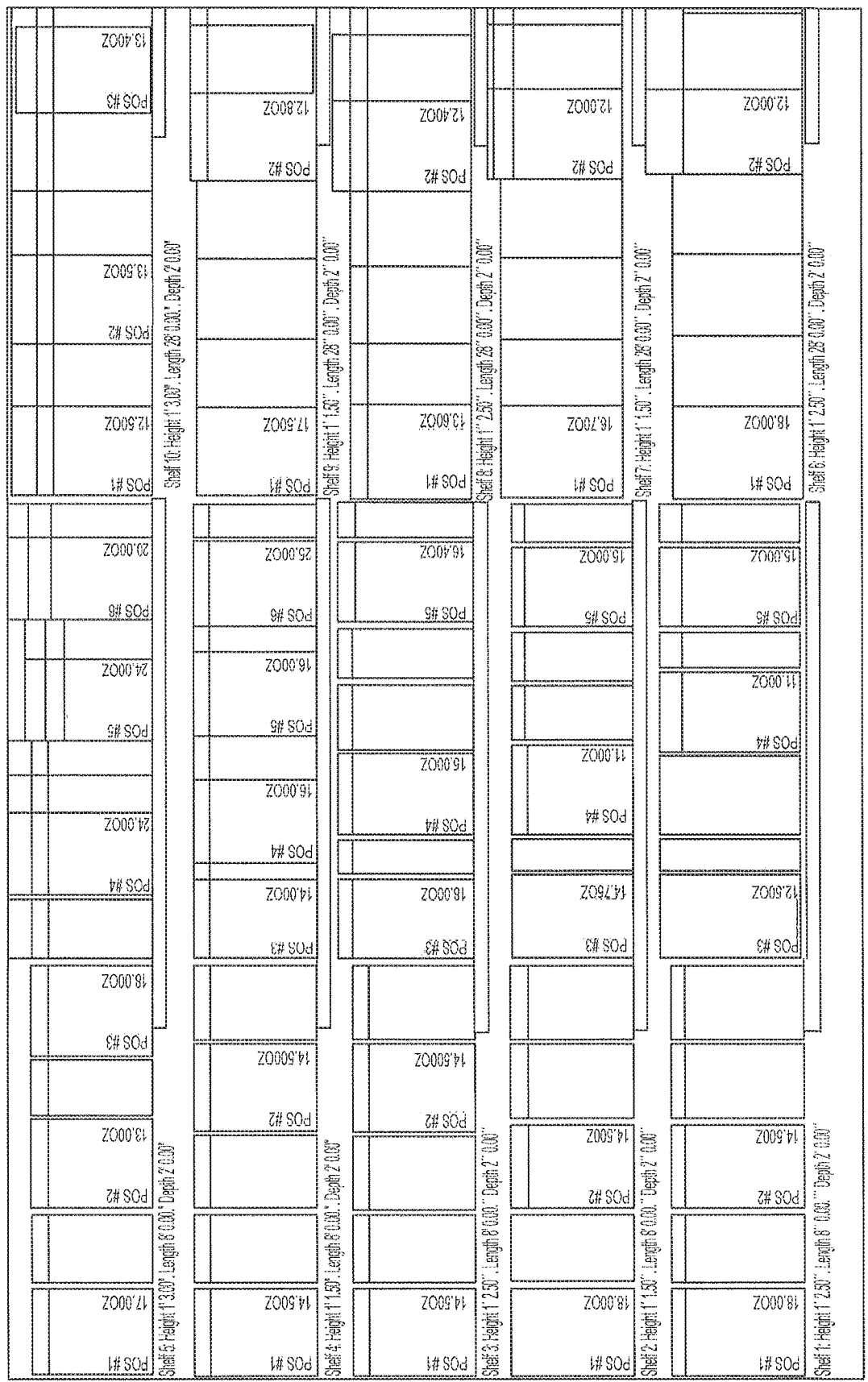
FIG. 2 is a schematic example of a planogram for products in a retail store.

The planogram library 122 may include diagrams, drawings, and/or models indicating a location and placement of each of the retail products in a retail store. For example, the location may refer to an aisle within a store, and placement may refer to a shelf in that aisle. Each diagram, drawing, and/or model may show placement of retail products on shelves and/or in an aisle in the retail store. As generally understood by one of ordinary skill in the art, planograms may be used and updated in order to increase customer purchases and maximize sales of products. FIG. 2 is a schematic example of a planogram for a retail store, showing product placement—e.g., an aisle, a shelf—within the retail store, and the information that is saved in the planogram library 122. Planograms may be changed and/or updated periodically and stored in the planogram library 122, as needed. Planograms include information for placement of products in the store, such as a particular aisle, side of aisle, shelf number, and position on the shelf. In an embodiment, the shelf and position on the shelf for a product may be used from the planogram library by the herein disclosed system and method to determine accuracy. For example, an end user/store personnel may scan products and shelf tags in an order from top to bottom of a shelving unit, and the data may be gathered to form planogram data for the shelves such that it may be used for comparison to the stored planogram data.

The communication circuitry 118 of the retailer management server 102 may be embodied as any type of communication circuit, device, interface, or collection thereof, capable of enabling communications between the retailer management server 102 and the hand-held portable terminal 140, and/or other computing devices. The communication circuitry 118 may be configured to use any one or more communication technologies (e.g., wireless or wired communications) and associated protocols (e.g., Ethernet, Wi-Fi®, WiMAX, etc.) to effect such communication.

Additionally, in some embodiments, the retailer management server 102 may further include one or more peripheral devices 120. Such peripheral devices 120 may include any type of peripheral device commonly found in a computing device or personal computer, e.g., a desktop computer or tablet, such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

In some embodiments, the retailer management server 102, the hand-held portable terminal(s) 140, enterprise server 155, printer 157, and/or other computing devices may communicate with each other over the computing network(s) 150. The network(s) 150 may be embodied as any number of various wired and/or wireless communication networks. For example, the network(s) 150 may be embodied as or otherwise include a local area network (LAN), a wide area network (WAN), a cellular network, or a publicly-accessible, global network such as the Internet. Additionally, the network(s) 150 may include any number of additional devices to facilitate communication between the retailer management server 102, hand-held portable terminal(s) 140, enterprise server 155, printer 157, and/or other computing devices. The network 150 as illustrated in FIG. 1 represents a number of networks that may be used, which, in some cases, may include more than one network. In an embodiment, the network 150 includes an enterprise computing network for communicatively coupling the enterprise server 155 with the store/retailer management server 102 or system such that data can be exchanged between the two. Such an enterprise computing network may include one or more computer networks (e.g., a wide area network, a personal area network, or a local area network), one or more cellular networks, one or more satellite networks, or combinations thereof. Accordingly, each of the enterprise server 155 and the retailer management server 102 may be communicatively coupled to the enterprise computing network via a wide area network, via a local area network, via a personal area network, via a cellular network, via a satellite network, or the like. Suitable wide area networks may include wired or wireless telecommunications networks that transmit information via coaxial cables, fiber-optic cables, radio-frequency transmission, or the like. Suitable local area networks may include wired ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As previously noted, the enterprise server 155 may store enterprise data and interact with a number of store computing systems or servers associated with a plurality of stores. The enterprise server 155 may store product data pertaining to products to be sold at one or more store locations, pricing data pertaining to the products to be sold at the one or more store locations, planogram data pertaining to the placement of products on shelves, label data to be displayed on shelf display units at the one or more store locations, multimedia content (e.g., pictures, video, sound, or the like), and the like. For example, the enterprise server 155 may be a central computing system operated by an owner of a grocery store chain or other retailer that owns a number of stores for selling products. Each of the retailer management servers 102 or systems may be associated with a store affiliated with, owned, or operated by the grocery store chain or other retailer. Each server 102 may receive information from the enterprise server 155 and use the received data, along with other data input to the store computing system by devices located at the store, to interface with and interact with any number of electronic components (e.g., cameras, point of sale devices, shelf displays, lighting systems, retail associate devices, personal assistant and liaison devices, etc.) at the store.

In another embodiment, the network 150 includes a store computing network for communicatively coupling the retailer management server 102 to the portable terminal 140, such that data can be exchanged between the components. The store computing network may include one or more computer networks (e.g., a wide area network, a personal area network, or a local area network), one or more cellular networks, one or more satellite networks, or combinations thereof. Accordingly, each portable terminal 140 may be communicatively coupled to the store computing network via a wide area network, via a local area network, via a personal area network, via a cellular network, via a satellite network, or the like. Suitable wide area networks may include wired or wireless telecommunications networks that transmit information via coaxial cables, fiber-optic cables, radio-frequency transmission, or the like. Suitable local area networks may include wired ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Moreover, the network 150 may include a printer network for communicatively coupling any or all of the following: the portable terminal 140 to the printer 157, the retailer management server 102 to the printer 157, and/or the enterprise server 155 to the printer 157. The printer network may include one or more computer networks (e.g., a wide area network, a personal area network, or a local area network), one or more cellular networks, one or more satellite networks, or combinations thereof. Accordingly, any or all of the portable terminal 140, the retailer management server 102, and/or the enterprise server 155 may be communicatively coupled to the printer network via a wide area network, via a local area network, via a personal area network, via a cellular network, via a satellite network, or the like. Suitable wide area networks may include wired or wireless telecommunications networks that transmit information via coaxial cables, fiber-optic cables, radio-frequency transmission, or the like. Suitable local area networks may include wired ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The printer 157 of the system 100 may be a local printer, e.g., in the store, or a printer provided at a remote printing company or service. The printer 157 is designed to print new shelf tags for products provided on a store shelves. The printer 157 may receive printing commands from either or both of the server 102 and/or hand held 140. The printed shelf tags may include a new tag barcode that includes a barcode with an encoded identifier and pricing information for a product. The printer may receive the file, before the printing of the new shelf tag, associated with the encoded identifier. In an embodiment, the server 102 sends the information for the tag (including pricing information) to the printer 157. Upon receipt of the file, the printer may execute and print the received information; specifically, in one embodiment, the printer 157 may be utilized, for example, to print the new or replacement tag that may be affixed to a shelf when an old, incorrect tag, or no tag, is provided on the shelf for a product. In one embodiment, the printer 157 is a local printer that is accessible in the store by store personnel or employee. In an embodiment, the printer 157 is a wirelessly connected printer. In an embodiment, the printer 157 may be transported or carried by an end user within an aisle of the store. In another embodiment, the printer 157 may be a printer that is provided by a remote printing company or service, or the retailer. For example, the company or retailer may periodically print new and/or updated shelf tags (e.g., paper tags) for a store and send such tags to the store so that the employees/personnel can apply the printed tags to the shelves for particular products. The new or replacement tag includes the stored price as well as the encoded identifier embedded in its barcode.

Figure 3:
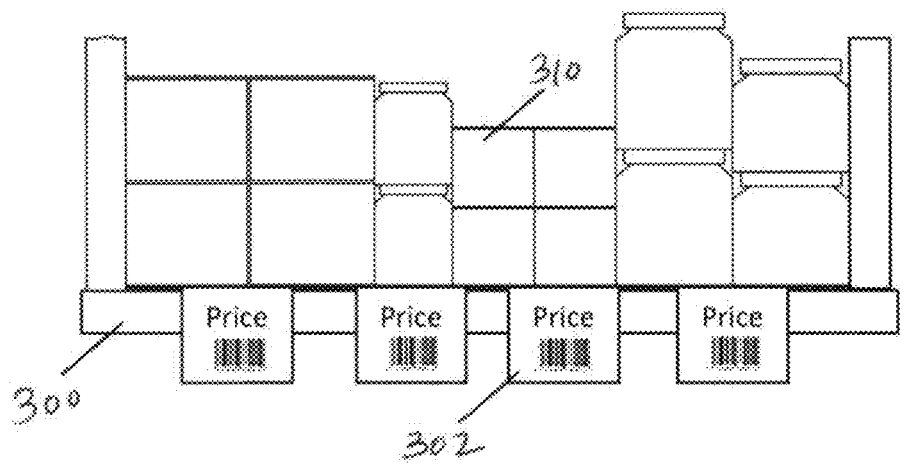
FIG. 3 is a schematic of products arranged on a shelf along with shelf tags attached to the shelf near the products, in accordance with an embodiment.
Figures 4, 5:
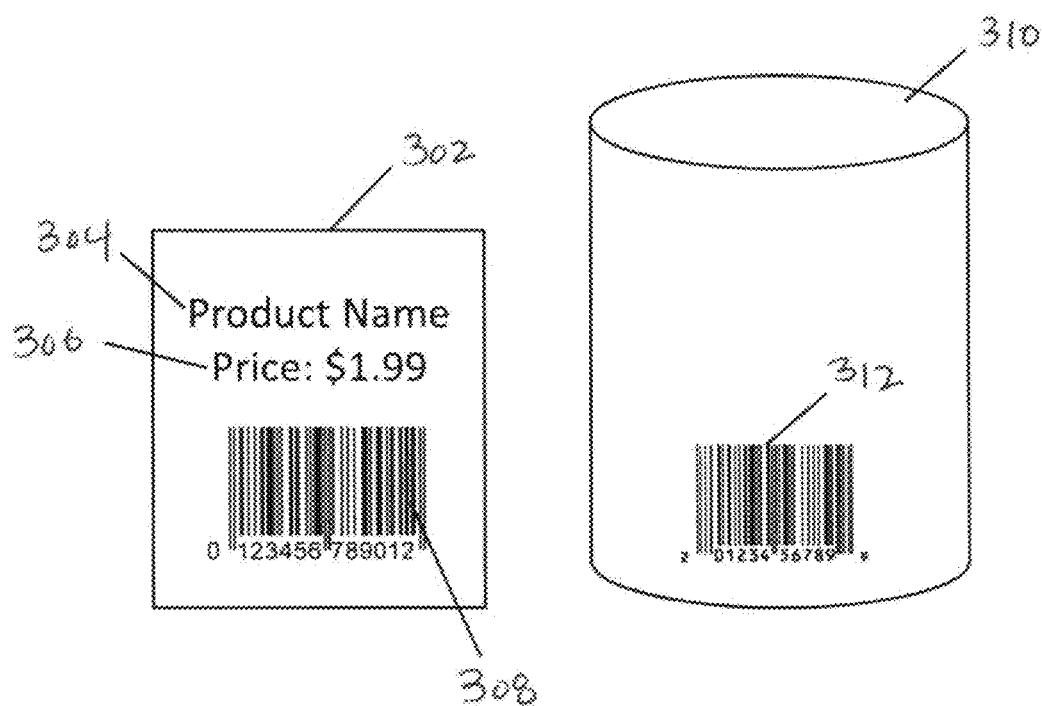
FIG. 4 is a detailed view of a printed shelf tag in accordance with an embodiment.
FIG. 5 is a detailed view of an exemplary product with a barcode (e.g., UPC, GTIN).

The "tag" or "shelf tag" that is described and scanned using the portable terminal 140 noted herein refers to physical, printed paper tag for a product that has product-related information and/or indicia printed thereon, e.g., a price tag associated with a particular product made by a manufacturer. The printed information on the tag may be graphics, text or words, and/or similar designs that attract a consumer/customer to a product. A tag could be made out of cardboard, cardstock, paper, wood, or other materials. In an embodiment, the shelf tag may include a product name, a numeric price (e.g., $0.99) as well as code (bar code, UPC, GTIN, etc.) thereon. FIG. 3, for example, shows a number of products arranged on a shelf 300 along with shelf tags that are affixed, attached, connected, or mounted to an edge of a shelf, e.g., at a location near a corresponding product. FIG. 4 shows one detailed example of a printed shelf tag 302 that includes a product name 304, price 306, and a barcode 308 with an encoded identifier embedded therein. The barcode 308 on the printed shelf tag 302 also includes price information for the product embedded therein. FIG. 5 shows an example of a product 310 with its UPC/GTIN 312 applied thereon, e.g., as part of its label or printed directly on the container itself. When the UPC/GTIN code 312 of the product is scanned, such as during a checkout process at the point of sale, a current POS price for purchasing that product from the retailer may be obtained from the server 102 (e.g., from the product price library 116). When the barcode 308 of the shelf tag 302 is scanned, the set price information for that tag may be obtained from the server 102.

An end user (e.g., store personnel or employee) is designed to use the hand-held portable terminal(s) 140 for verifying prices associated with or displayed on shelf tags and locations for products on a shelf, like shelf 300, that are carried by a retailer and/or a store, against the current POS prices obtained when the barcode (GTIN, UPC) of the product is scanned (the process of which is further explained later with reference to FIG. 8). The portable terminal 140 or hand-held should be understood to mean a tool, device, or apparatus that may be held or used by a user in their hand, and that is configured to scan a code (e.g., UPC, barcode, etc.) and a numeric price on a tag that is associated with a product, and process information or data related to the scanned code and price. The retailer management server 102 may facilitate interaction with and control of the terminals 140. The portable terminal 140 is a mobile computing device that may be used by a retail associate or personnel at a store to assist with at least a function of scanning shelf tags to verify displayed pricing information of tags with POS prices in the database/server 102. In an embodiment, the portable terminal 140 may further assist in the performance of a variety of functions, such as restocking shelves, setting planograms, scanning product SKUs, and the like. The portable terminal 140 is a computing device that includes, for example, a processor, a data storage component and/or a non-transitory memory component, hardware such as input/output hardware and network interface hardware, and a local interface. In addition, as explained in further detail below, in one embodiment, this portable terminal 140 includes a contained alarm system, i.e., within a housing of the terminal itself, that is designed to issue an alert or alarm based on one or more inconsistencies determined using the processor of the hand-held portable terminal 140. In an embodiment, the alarm system of the portable terminal 140 may utilize components provided in the portable terminal 140 itself, e.g., existing sound or vibration devices, microphones, and/or speaker(s) provided in an electronic device that is used as the portable terminal.

Figure 6:
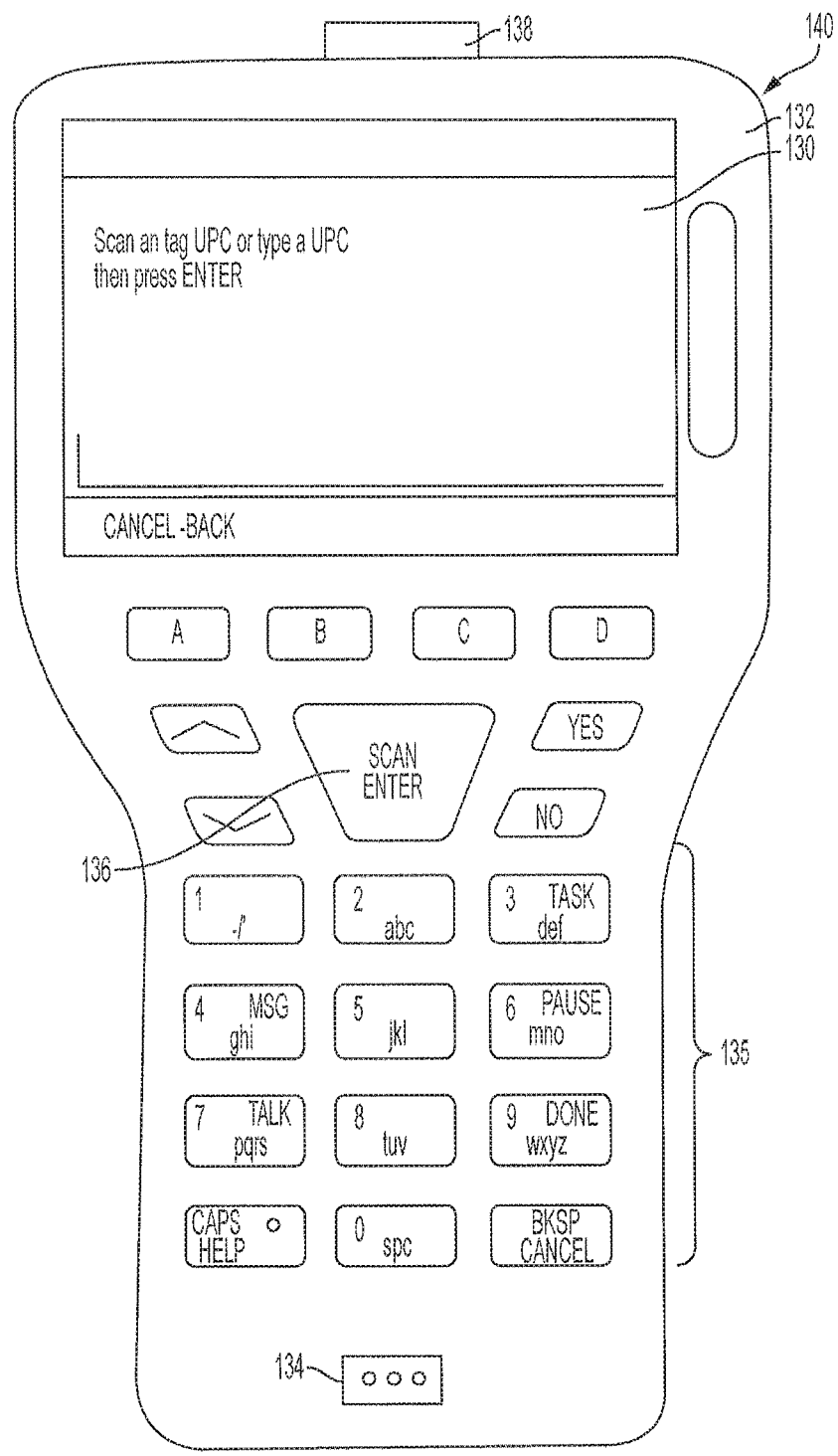
FIG. 6 is a schematic drawing of an exemplary embodiment of the hand-held, portable terminal of the system of FIG. 1.

FIG. 6 illustrates a schematic representation of a housing 132 of a portable terminal 140 used with the herein disclosed system and method, in accordance with one embodiment. Although a single terminal 140 is shown, it should be understood that more than one terminal 140 may be provided, such that different users or store personnel may carry and use each terminal 140. The terminal 140 is provided with at least a display 130 or screen on the housing 132 and speaker holes 134 for an alarm issued by a system (see, e.g., FIG. 7) contained therein. The display 130 may be in the form of a touch screen, LCD screen, plasma screen, TFT screen, or the like. The display 130 may display data including, but not limited to, a product name, a POS price, a price associated with a tag barcode, planogram data, and/or other data accessed via a scanned code on the product and/or on the shelf tag. In addition, the display 130 may be configured to show messages to the user, including, for example, a notification message relating to the disclosed process (e.g., a determined inconsistency). In an embodiment, the display 130 may function as both a display screen and a data input device; the display 130 may be a graphic-type display having a touch screen, for example. The housing 132 of the portable terminal 140 may contain a rechargeable battery (not shown) inside or on its casing, to provide power to the display 130 and parts contained therein. In an embodiment, one or more types of connectors (not shown) are provided on the housing 132 to connect and charge the battery therein. The type of connectors associated with the housing 132 are not intended to be limiting.

In an embodiment, the portable terminal 140 may be ergonomically designed for an end user's hand. In some cases, the hand-held tool may be shaped to include a handle and trigger, e.g., like a gun. When scanning tags, the positioning of the terminal 140 (e.g., vertical or horizontal) is not intended to be limiting. As such, in an embodiment, the display 130 position (e.g., portrait or landscape) is also not intended to be limited. In some cases, the hand-held tool may be shaped to include a handle and trigger, e.g., like a gun. In one embodiment, the housing 132 of the terminal 140 may be provided with a tactile input device (e.g., a keypad, buttons, keyboard, mouse, or the like) for performing various user functions. For example, a numerical entry pad 135 including buttons for numbers and/or letters (e.g., much like a telephone keypad) may be provided on the housing 132. In another embodiment, a QWERTY keyboard may be provided. In an embodiment, a trigger button 136 may be provided on the housing 132 to activate a scanner 151 (see FIG. 7) or parts of scanning system that includes a reader (represented by schematically drawn window 138 in FIG. 6) to scan a barcode or UPC code on a tag for a particular product. For example, the scanner may be an optical code reader (OCR) that includes a light source associated with a lens and a sensor, all of which are contained within the housing 132, in accordance with an embodiment. The light source may be emitted through the window 138 when the scanner of the hand-held 140 is activated. Also, other buttons or keys may be provided on the housing 132, e.g., scroll buttons, selection buttons, etc., in accordance with an embodiment. In an embodiment, a combination of physical buttons provided on the housing 132 as well as digital buttons provided on the digital display 130 (e.g., an electronic keyboard or entry system) may be used in the portable terminal 140. In an embodiment, a button may be provided on the housing 132 for an end user to activate if, after scanning a barcode or UPC, the user desires to obtain additional information about the product. For example, if a user scans a UPC, a button may be pressed to access the data storage 110 and further display information about the product, including, its manufacturer, brand, description, and/or planogram information. In an embodiment, the display 130 is configured to display all information regarding a product after scanning a UPC and/or tag barcode.

In one embodiment, a button is provided to confirm and deactivate an alarm issued via the hand-held portable terminal 140. For example, once an alarm is issued (e.g., sound is emitted from speaker 156 (see FIG. 7) through holes 134, or vibrated using a vibration emitter 158 (also shown in FIG. 7)), the user may acknowledge and stop issuance of the alarm by pressing the associated button.

Figure 7:
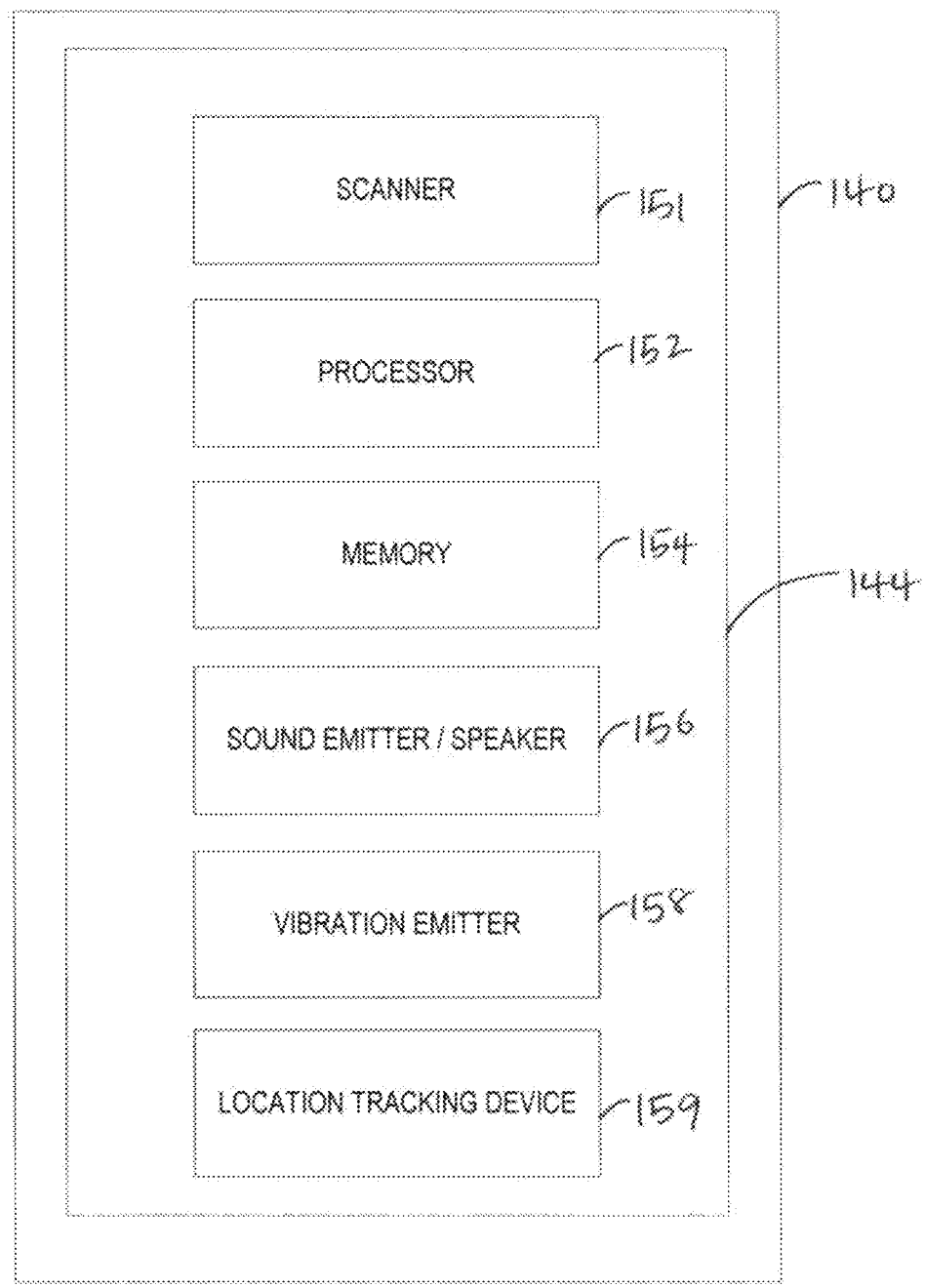
FIG. 7 is a schematic drawing of parts contained within a housing of the hand-held, portable terminal of FIG. 6.

Referring now to FIG. 7, exemplary hardware components of a computing or processing system 144 (also generally represented in FIG. 1) that are contained in the portable terminal 140 are schematically illustrated. Each hand-held, portable terminal 140 includes in its housing 132, for example, as part of its CPU or system 144, a scanner 151 or scanning system for scanning a code and price on a tag associated with a product of a manufacturer, a processor 152 (including, but not limited to, a main circuit board (or controller)), an alarm system 160 including a sound emitting device 156 (e.g., speaker) and/or a vibration emitting device 158, and other CPU components including, but not limited to, a memory 154 and a location tracking circuitry 159. Scanner 151 may be a reader and/or imager that include a light source, a lens, and a sensor, as previously noted, for example, the light source being emitted through window 138. Scanner 151 may further include an optical character recognition ("OCR") engine for recognizing alphanumeric characters on the tag. The scanner 151 or scanning system of the portable terminal 140 is configured to include a number of types of alphanumeric reader(s) and code reader(s) (e.g., to read one and two dimensional bar codes, such as GTIN, UPC, EAN, JAN, and/or PDF codes, as previously noted). Such scanners and readers are generally known in the art and thus not explained in great detail here.

A processor (e.g., processor 152 as shown in FIG. 7) associated with the scanner 151 is configured to process the information that is read or scanned by the scanner, including a barcode of a shelf tag. Processor 152 may also be configured to send and receive information to/from the retailer management server 102. The processor 152 includes a processing component configured to receive and execute instructions from a data storage component of the memory 154. The memory 154 of the portable terminal 140 may be configured as volatile and/or nonvolatile computer readable medium (volatile random access memory (RAM) or nonvolatile RAM) and, as such, may include random access memory (including SRAM, DRAM, and/or other types of random access memory), flash memory, registers, and/or other types of storage components. Memory 154 may be used to store, at least temporarily, information collected by the hand-held 140 and/or the server 102. The memory 154 may be configured to store logic that causes the portable terminal 140 to perform the functions described herein when executed by the processor. Processor 152 also receives and processes product data and planogram data from the server 102, e.g., from data storage 110 and/or its libraries, using network interface hardware. As represented in FIG. 1, portable terminal 140 is configured to communicate with the retailer management server 102 via communication network(s) 150 (e.g., such as a store computing network as described previously). The terminal 140 may communicate over a wireless wide area network and/or a local area network that conforms to the IEEE 802.11 standard. The connection between 140 may be through a wireless router or another wireless connection that is connected to the server via the Internet. Moreover, network interface hardware of the terminal 140 may include any wired or wireless networking hardware, such as a modem, LAN port, wireless fidelity (Wi-Fi) card, WiMax card, mobile communications hardware, and/or other hardware for communicating with the retailer management server 102 or with other devices. A local interface of the product terminal 140 may be implemented as a bus or other interface to facilitate communication among the components of the terminal 140. Data is transmitted between (to and from) retailer management server 102 and processor 152.

Location tracking circuitry 159 enables the system 100 and server 102 to determine the location of the portable terminal 140 within the retail store. For example, location tracking circuitry 159 may utilize Zigbee technology, Bluetooth technology, GPS, or similar locator services to determine the location of the hand-held terminal 140, in real-time, within an aisle of the retail store. As such, as explained herethroughout, when a user scans a tag using the terminal 140, the location of the shelf tag being scanned may be determined, and the system 100 may be configured to determine if the location of the scanned shelf tag matches the planogram data as stored in the system.

The alarm system 160 is utilized to emit an alert or alarm to an end user with the hand-held, portable terminal 140. In accordance with an embodiment, an alarm or alert is issued when an error or inconsistency between local shelf tag data and stored data as maintained in the server is different. The type of alarm issued by alarm system 160 is not intended to be limiting. In one embodiment, the alarm system 160 includes a sound emitting device 156 (e.g., speaker), a vibration emitting device 158, or both. Sound emitting device 156 may be provided in the form of a speaker positioned near the speaker hole 134 in the terminal 140, designed to issue an audio sound therefrom. Audio sounds emitted from the speaker (156) may include beeps, sound effects, sound sequences, and/or voice alerts or phrases. The vibration emitting device 158 may be a vibration mechanism such as those that known in the art, including, for example, a rotor or motor associated with a weight or balance mechanism, shaft, and actuator(s).

The features and parts contained within the hand-held portable terminal 140 as shown in the representations of FIGS. 6-7 are not intended to be limiting. Other features may also be provided. For example, in an embodiment, the portable terminal 140 is provided with a voice communication system that includes a microphone to receive audio commands. Although not specifically illustrated in FIG. 7, the terminal 140 may include a number of other input/output devices, such as a camera, a reader, a microphone, or the like, for receiving, sending, and/or presenting data.

Moreover, although FIGS. 6-7 show specific examples and designs of hardware for the portable terminal 140, it should be understood that the depiction of the portable terminal 140 in FIG. 6-7 is not intended to be limiting. Specifically, the portable terminal 140 need not be a separate device that is manufactured solely for the purpose of scanning retail products. In an embodiment, the portable terminal 140 may be a portable digital assistant ("PDA") computer, a mobile phone or a cell phone, a tablet, a phablet, or a designated device that includes a scanner and/or product identification reader. In one embodiment, the herein described functions and parts associated with the portable terminal 140 (e.g., processor, scanner, etc.) may be associated with an application (or "app") that may be downloaded (via network 150) to an electronic device or computer. Accordingly, although the description herein generally refers to the system and process utilizing the example illustrated in FIGS. 6-7, one should understand that reference to parts of that device, e.g., display 130, buttons of the pad 135, trigger button 136, etc. and the functions they perform may alternately refer to or be implemented by any type of physical or digital button(s) provided on another electronic device, including a mobile phone or a cell phone, a tablet, a phablet, or similar portable computer. Additionally, as previously described, the alarm system may be implemented via parts of a sound system (speaker, microphone, etc.) already provided in an electronic device.

Figure 8:
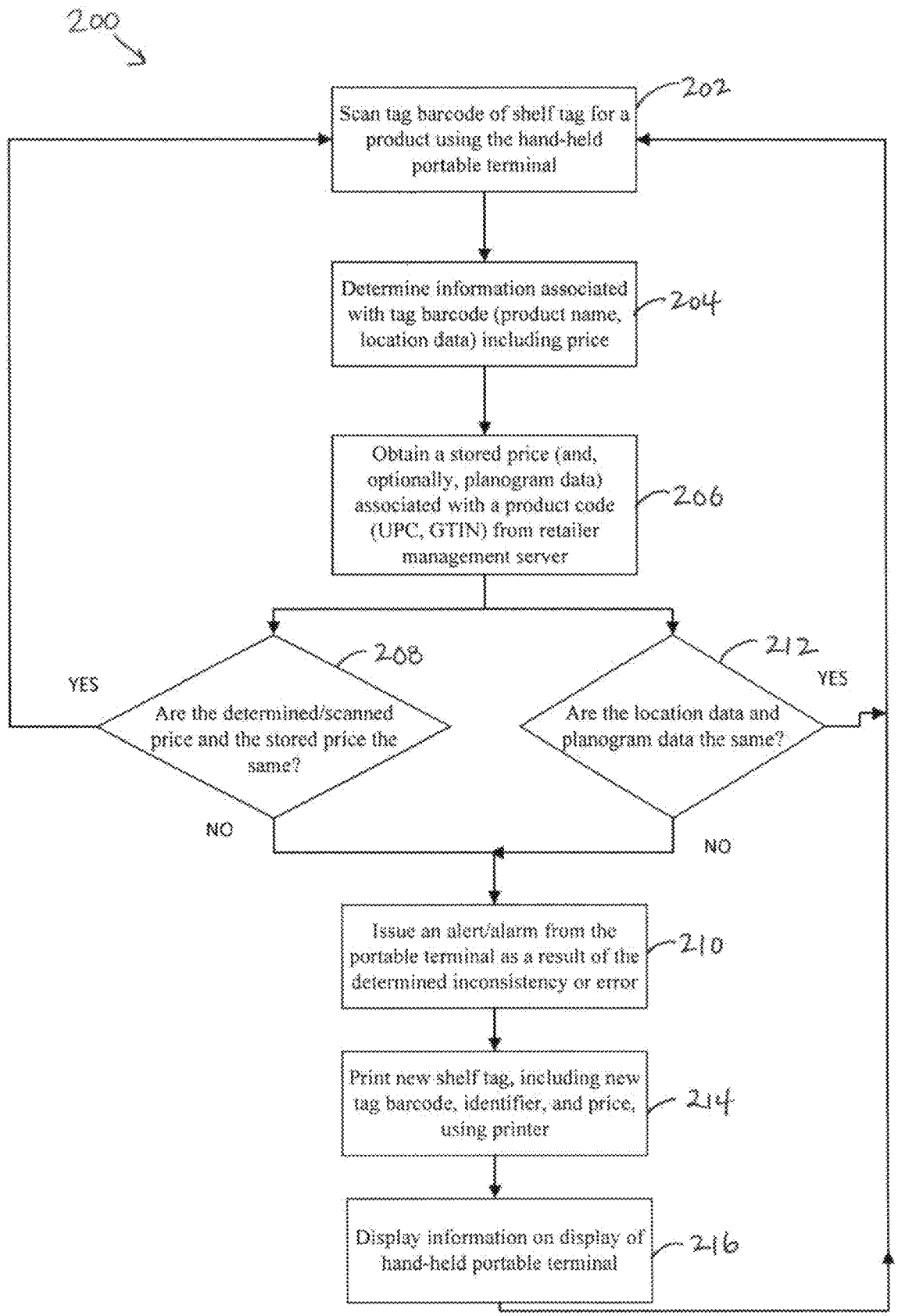
FIG. 8 is a flow diagram of a method for verifying prices on shelf tags, locations, and related information for products carried by a retailer or a store utilizing the system of FIG. 1.

FIG. 8 is a simplified flow diagram of a method 200 for verifying product prices and related information of products on a shelf that are carried by a retailer or store utilizing the system of FIG. 1. This flow chart shows some of the steps and processes that may be implemented in the verification method 200. A tag barcode on shelf tag for a product is scanned using the hand-held portable terminal (140), as shown at 202. Specifically, the scanner (151) of the portable terminal reads the GTIN/UPC/barcode provided on the tag for that product. Information, such as the product name and location data that corresponds to that tag barcode, as shown at 204, may be determined (e.g., via server 102). A stored price associated with the UPC of that product is obtained from a retailer management server (102), shown at 206. For example, in an embodiment, the stored price associated with the determined product may be accessed via determining the product associated with the tag barcode. In another embodiment, the stored price associated with the product may be obtained (from server 102) via scanning a Global Trade Item Number (GTIN) or a Universal Product Code (UPC) of the product of the manufacturer that is on the shelf. That is, the user may scan the tag barcode and then scan the product barcode (or vice versa). In an embodiment, the information from the scanned barcode(s) is communicated via network 150 to and from the hand-held portable terminal 140 and server 102. For example, a signal may be sent from the portable terminal 140 to the server 102, and the information may be obtained from data storage 110 and optionally communicated back to the hand-held 140.

In an embodiment, the comparison of the price associated with the tag barcode and the stored price is compared at the server 102. Upon obtaining of the stored price, for example, the server 102 or its processor 104 compares the received/scanned price associated with the tag of the product and the stored price received from the database/retailer management server, as shown at 208. If the two prices match and are determined to be the same, i.e., the answer is YES at 208, the process restarts at 202 by scanning the next tag and/or product. However, if the processor/server determines an inconsistency or error based on the comparison of the two prices at 208, i.e., the answer is NO, an alert is triggered and issued, from the hand-held, portable terminal, as a result of the determined inconsistency, as shown at 210. Specifically, the processor 104 or server 102 sends a signal to the hand held 140 to issue the alert. As previously noted, the issued alert may be provided in the form of an audio alarm via a sound device/speaker 156 that is within the hand-held portable terminal through its speaker holes 134 in the housing 132, vibrations via a vibration device 158 that is within the hand-held portable terminal, or both.

In another embodiment, the comparison of step 208 is implemented and compared at the terminal 140. That is, the stored price information may be sent over network 150 from the server 102 to the processor (152) in the hand-held 140, along with the price information for the scanned tag barcode, and the processor is configured to determine if the comparison is consistent or matches, or if an alert should be issued. If the two prices match, i.e., the answer is YES at 208, the process restarts at 202 by scanning the next tag and/or product. However, if the processor (152) determines an inconsistency or error based on the comparison of the two prices at 208, i.e., the answer is NO, an alert is triggered and issued, from the hand-held, portable terminal, as a result of the determined inconsistency, as shown at 210.

In an embodiment, the alarm may optionally repeat until a user acknowledges the alarm via pressing a button (e.g., button 136) on the hand-held portable terminal 140.

In addition to the above noted comparison at 208, another comparison, as shown at 212, may be performed by server and/or terminal. The comparison at 212 may be performed before, after, or simultaneously as the comparison at 208. In an embodiment, the method further includes, determining, by the retailer management server, planogram data associated with the product. In one embodiment, the retailer management server 102 is used to determine and receive a location of the hand-held portable terminal, e.g., via Zigbee or Bluetooth or wireless location technology, within the store. It may be obtained or received by the hand-held 140 along with the stored price data, as well. The order of obtaining and/or receiving the location information is not limiting. Based on this location information, then, at 212, the determined location data and the stored planogram data for the product are compared. The comparison may be performed at the server 102, e.g., via processor 104 or via the hand-held portable terminal 140, e.g., via processor 152. If the two locations substantially match and are determined to be the same, i.e., the answer is YES at 212, the process restarts at 202 by scanning the next tag or product. However, if the processor 152 of the hand-held 140 determines an inconsistency or error based on the comparison of the two locations at 208, i.e., the answer is NO, an alert is triggered and issued. In one embodiment, the alert is issued by the hand-held, portable terminal, as a result of the determined inconsistency, as shown at 210. The server 102 or processor 104 may signal the hand-held to issue the alert, or the processor 152 may issue the alert. Again, the alarm may optionally repeat until a user acknowledges the alarm via pressing a button on the hand-held portable terminal 140. In another embodiment, the alert may be issued and sent from the server 102 and/or hand held 140 over the network to the retailer, e.g., a division office that controls planogram mapping, and the end user is not identified of the error in location.

In an embodiment, the location tracking device (159) is configured to determine a specific height and/or linear position of a product on each shelf, e.g., by using the hand held and additional systems (e.g., cameras) located in the store. In an embodiment, a user may scan a barcode associated with an aisle (e.g., a tag provided on an end shelf of the aisle) and then scan a code associated with a particular shelf within the aisle to determine the user's location in the retail store. Then, the products on that shelf may be scanned to determine and verify their location against the stored planogram data. All processing may be performed in the server 102, in accordance with an embodiment. In another embodiment, processing may be performed in the hand held.

The method 200 as illustrated in FIG. 8 shows two examples of comparisons at 208 and 212 that are made to determine errors or inconsistencies, and issuing an alert or alarm as a result of a positive determination of such errors or inconsistencies. However, method 200 is not limited solely to these comparisons and verifications or to issue alerts only for these types of determinations. Rather, the system and method may include additional factors and verification processes for determining inconsistencies with regards to the tag, and/or may include further determinations for issuing an alert/alarm. For example, as previously noted, the tag may include a printed numeric price (e.g., $0.99) and a code (bar code, UPC, etc.) thereon. The tag may be "associated" with a product by way of placement on a display shelf, for example, relative to the location of the product placement on the shelf. The code on the shelf tag may be used to check items in addition, or alternatively, to price and location information for the product. In accordance with an embodiment, tag factors that are checked by the system 100 may include—but are not limited to—regular retail, regular retail quantity amount (e.g. "4" in the "4/$5.00"), regular unit price (e.g. 2.95 cents per ounce), promotional retail, promotional retail quantity amount, promotional unit price, final event price (e.g., if this purchase (of this product) qualifies for an event such as "Buy 5, Save $5" what would be the final cost for that item after qualification), and savings with card (communicates to the customer the savings they would have if they used their loyalty card). In one embodiment, the inconsistencies that may cause the system 100 to issue an alert from the terminal 140 include—but are not limited to—GTIN scanned twice, tag scanned twice, GTIN doesn't exist, GTIN doesn't match, promotion has expired, scanning retail doesn't match tag retail, scanning loyalty retail doesn't match tag loyalty retail, scanning and tag retail match but promotion is expired, planogram compliance (or non-compliance), and reminder to print tag batch.

In addition to issuing an alert as a result of a determined error or inconsistency, the method 200 and system 100 are further configured to automatically print a new shelf tag, as shown at 214, when the determination is made that there is an error with regards to the scanned shelf tag, in accordance with an embodiment. In an embodiment, the file associated with the encoded identifier of the tag barcode is sent to the printer (157) as a result of a command (e.g., sent from a processor 104 of the server 102 or sent from processor 152 of the hand held 140, via network 150) that is issued as a result of the determined inconsistency or error. In an embodiment, the hand held may send a command to the server, and then the server to the printer. The printer may be on site, i.e., in the store, or a printer that is associated with a remote site, e.g., a printer or a printing company that maintains the printer. The printer may receive the file of the encoded identifier and determine, e.g., the product and retailer associated with the file, before printing of the new shelf tag. The printer may automatically print a new shelf tag, including a new tag barcode that includes the encoded identifier and the store price, for example.

The method 200 may further include a step 216 for displaying information related to the prices and location/planogram of the associated product. In an embodiment, the method 200 includes displaying, via the display (130) on the hand-held, portable terminal (140), at least the stored planogram data associated with the product or tag. The data may be displayed to a user as a result of the determined inconsistency or error, e.g., in addition to issuing the alert, such that the user may determine placement for the associated product. In an embodiment, the method 200 may include displaying, via the display (130), product description data associated with the product. For example, the product description data may be obtained via the server 102 and include at least one of: a brand name, a product name, a product size, and a product weight.

Figure 9:
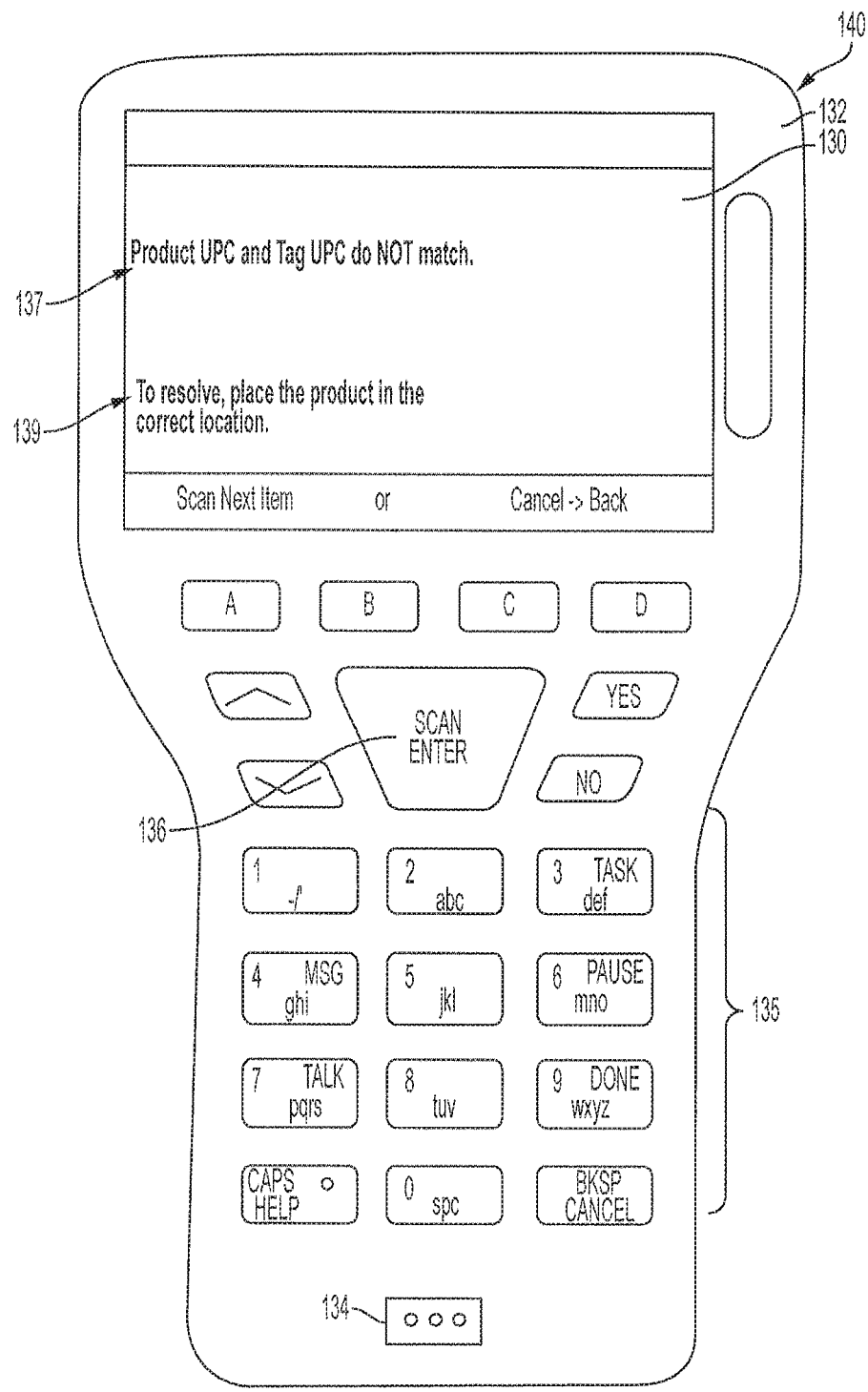
FIG. 9 is a schematic drawing of a portable terminal displaying a notification message upon determination of an inconsistency or error using the system of FIG. 1.

In an embodiment, step 216 of the method 200 may include displaying, via the display 130 on hand-held 140, a notification message relating to the determined inconsistency. For example, if the location data and planogram information are consistent and correct, but the price is not, the display 130 may include a message to note that the price is incorrect. FIG. 9 is a schematic drawing of portable terminal 140 displaying a notification message 137, e.g., "Product UPC and Tag UPC do NOT match" to show the end user the identified type of inconsistency or error. Other notifications may be issued, e.g., "Planogram error", "Incorrect price," etc., that correspond to the previously mentions factors and inconsistencies, as listed above. In an embodiment, the price data on the tag versus the stored (POS) price data may be displayed on the display for the end user.

Although the above method and system is described as issuing an alarm or alert via alarm system 160 in hand-held 140, it should be noted that emission of sounds and/or vibrations using hand-held 140 is not limited to those associated with an alarm, inconsistency, or error. For example, in an embodiment, the hand-held may be configured to emit a positive confirmation sound—e.g., bell, ding, etc.—through its speaker or alternate vibration pattern when a scanned price from a tag is confirmed to match a stored price. Similarly, a positive confirmation sound may be issued when location data is consistent with a stored planogram. In an embodiment, a sound, vibration, or other confirmation may be issued when information is read and received, before any processing is performed.

As such, the disclosed system and method allows for checking a displayed price on a tag with a stored price via reading/scanning prices and UPCs (or other codes) of products by using a hand-held tool. The hand held is configured to provide an alarm to signal a price inconsistency/error to a user. This expedites the product price/display tag verification process and allows a user to reduce time during the verification process as the user may continually scan until the alarm is issued, without needing to take the time and visually inspect the printed price information on the shelf tag versus the obtained price information pulled from the server and displayed, e.g., on the hand held. Additionally, the disclosed system and method increases the display information on a screen of the hand-held tool beyond simply just a price associated with a scanned code; specifically, it verifies planogram information using the hand-held as the pricing information is gathered, as well as verifies that the scanning is accurate. Thus, in addition to visually displaying information related to the scanned code (e.g., product information), an audio indicator is utilized to alert a user regarding a determination (e.g., when a displayed price does not match the stored price).

Accordingly, the disclosed system and method enables a significant cost savings with regards to costs and money associated with user/employee labor and mismatched prices on products.

In addition to the above described features, this disclosure also relates to a method of verifying prices displayed on tags and locations for products on a shelf that are carried by a store, using a server. The method includes: receiving information from a scanned shelf tag, the received information including an encoded identifier and price information associated with a barcode as displayed via the scanned shelf tag for a product provided on a shelf in the store; determining the product associated with the received information; obtaining, from a database, a stored price associated with the determined product; comparing the stored price to the price information of the scanned shelf tag and determining an inconsistency between the stored price and the price information based on the comparison; communicating the determined inconsistency to a hand-held, portable terminal in order to issue an alert to an end user in the store; issuing a command, as a result of the determined inconsistency, to a printer to print a new shelf tag including a new tag barcode comprising: the encoded identifier and the stored price; and printing the new shelf tag using the printer.

This disclosure also relates to a method of verifying prices displayed on tags and locations for products on a shelf that are carried by a retailer or a store, using a hand-held portable terminal comprising a display. The method includes: scanning, by the hand-held, portable terminal, a tag barcode provided on a tag affixed to a shelf of the retailer or store, the tag being associated with a product of a manufacturer and the tag barcode including: an encoded identifier and price information for the associated product embedded therein; scanning a Global Trade Item Number (GTIN) or a Universal Product Code (UPC) of the product of the manufacturer; receiving a stored price associated with the GTIN or UPC of the product from a store server; comparing, at the portable terminal, the stored price to the price information of the scanned tag barcode and determining an inconsistency between the stored price and the price information based on the comparison; issuing an alert, using the hand-held, portable terminal, as a result of the determined inconsistency; issuing a command, as a result of the determined inconsistency, from the portable terminal to a printer to print a new shelf tag including a new tag barcode including: the encoded identifier and the stored price; and printing the new shelf tag using the printer. The alert is provided in the form of (a) an audio alarm via a sound device and/or (b) vibrations via a vibration device, that is within the hand-held portable terminal.

While the principles of the disclosure have been made clear in the illustrative embodiments set forth above, it will be apparent to those skilled in the art that various modifications may be made to the structure, arrangement, proportion, elements, materials, and components used in the practice of the disclosure.

For example, although reference is made throughout this disclosure to verifying a match in store prices, one of ordinary skill in the art should note that the use of the hand-held and/or the method of verification described herein is not limited to store inventory. The scanning of codes and verification process may be used with any number of other of items and locations and is not necessary limited to a physical retail store for consumers. Such examples include, but are not limited to, warehouse inventory, labs, kiosk displays, medical inventories and/or pharmacies, and the like.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A method of verifying prices displayed on tags and locations for products on a shelf that are carried by a retailer or a store, the method comprising:
    scanning, by a hand-held, portable terminal, a tag barcode provided on a tag affixed to a shelf of the retailer or the store, the tag being associated with a product of a manufacturer and the tag barcode comprising: an encoded identifier and price information for the associated product embedded therein;
    determining, via the retailer management server, for each scanned tag barcode: (a) the product associated with the scanned tag barcode and (b) stored planogram data accessed via the scanned tag barcode and which is associated with the determined product;
    further determining, by the retailer management server, location data of the hand-held, portable terminal within the retailer or store using location tracking circuitry provided within the hand-held, portable terminal, to thereby determine a location of the scanned tag barcode and the determined product within the retailer or store;
    obtaining, via the retailer management server, a stored price associated with the determined product;
    comparing, using the retailer management server, for each scanned tag barcode: (a) the stored price associated with the determined product to the price information of the scanned tag barcode and (b) the stored planogram data for the determined product to the determined location of the determined product;
    determining (a) a price inconsistency between the stored price and the price information based on the comparison and (b) a planogram inconsistency between the stored planogram data and the determined location data based on the comparison, for the determined product;
    communicating the determined price inconsistency and the planogram inconsistency for the determined product from the retailer management server to the hand-held, portable terminal;
    issuing an alert, using the hand-held, portable terminal, as a result of the determined price inconsistency and the planogram inconsistency;
    issuing a command, as a result of the determined price inconsistency, from the retailer management server to a printer to print a new shelf tag including a new tag barcode comprising: the encoded identifier and the stored price; and
    printing the new shelf tag using the printer,
    wherein the alert is provided in the form of (a) an audio alarm via a sound device and/or (b) vibrations via a vibration device, that is within the hand-held, portable terminal.

2. The method according to claim 1, wherein the encoded identifier of the tag barcode corresponds to a file associated with the determined product, wherein the method further comprises sending the file to the printer, before the printing of the new shelf tag.

3. The method according to claim 1, wherein the method further comprises scanning a Global Trade Item Number (GTIN) or a Universal Product Code (UPC) of the product of the manufacturer before the obtaining of the stored price, and wherein the stored price is a point-of-sale price associated with a Global Trade Item Number (GTIN) or a Universal Product Code (UPC) of the product.

4. The method according to claim 1, further comprising displaying, via a display on the hand-held, portable terminal, product description data associated with the determined product, the product description data including at least one of: a brand name, a product name, a product size, and a product weight.

5. The method according to claim 1, further comprising displaying, via a display on the hand-held, portable terminal, a notification message relating to the determined inconsistency.

6. The method according to claim 1, wherein
    the determined location data is obtained via location tracking circuitry comprising Zigbee technology, Bluetooth technology, GPS, or wireless location technology within the retailer or the store.

7. The method according to claim 1, further comprising displaying, via a display on the hand-held, portable terminal, at least the stored planogram data associated with the determined product for determining placement for the associated product.

8. A system comprising:
    a retailer management server comprising data storage, the data storage comprising data related to products including stored prices for the products and planogram data for each product;
    a communication network;
    a hand-held, portable terminal comprising:
        a scanner for scanning a tag barcode provided on a tag affixed to a shelf of a retailer or a store, the tag being associated with a product of a manufacturer and the tag barcode comprising: an encoded identifier and price information for an associated product embedded therein, and the planogram data of the associated product being accessible via the scanned tag barcode,
        a processor for processing, sending, and receiving data to and from the retailer management server,
        location tracking circuitry to relay location data,
        an alarm system comprising a sound device and/or a vibration device,
        a display, and
        a sound device and/or a vibration device contained therein; and
    a printer for printing tags for shelves for the retailer or the store;

the hand-held, portable terminal and the retailer management server being configured to communicate via the communication network, wherein, for each scanned tag barcode, the hand-held, portable terminal is configured to issue an alert provided in the form of (a) an audio alarm via the sound device and/or (b) vibrations via the vibration device as a result of (a) a determination that a price on the tag affixed to the shelf obtained via the tag barcode scanned by the scanner is inconsistent with a stored price for the associated product obtained via the data storage from the retailer management server and (b) a determination that location data for the associated product obtained via the location tracking circuitry and scanning the tag barcode using the hand-held, portable terminal is inconsistent with the planogram data for the product from the retailer management server, and wherein the printer is further configured to automatically print a new shelf tag including a new tag barcode comprising: the encoded identifier and the stored price, as a result of the determination of the price being inconsistent.

9. The system according to claim 8, wherein the relayed location data is obtained using the location tracking circuitry comprising Zigbee technology, Bluetooth technology, GPS, or wireless location technology within the retailer or the store.

10. A method of verifying prices displayed on tags and locations for products on a shelf that are carried by a store, using a server, the method comprising:
receiving information from a scanned shelf tag, the received information comprising an encoded identifier and price information associated with a barcode as displayed via the scanned shelf tag for a product provided on a shelf in the store;
determining the product associated with the received information;
receiving location data of the scanned shelf tag and determining a location of the determined product in the store based on the received location data of the scanned shelf tag, the location data being determined using location tracking circuitry provided within a hand-held, portable terminal that is used for scanning the shelf tag;
obtaining, from a database, a stored price for the determined product and stored planogram data accessed via the scanned shelf tag and which is associated with the determined product;
comparing the stored price for the determined product to the price information of the scanned shelf tag and determining a price inconsistency between the stored price for the determined product and the price information based on the comparison;
comparing the stored planogram data for the determined product and the determined location of the product and determining a planogram inconsistency between the stored planogram data for the determined product and the determined location of the product based on the comparison;
communicating the determined price inconsistency and the planogram inconsistency for the determined product to the hand-held, portable terminal in order to issue an alert to an end user in the store;
issuing a command, as a result of the determined price inconsistency, to a printer to print a new shelf tag including a new tag barcode comprising: the encoded identifier and the stored price; and
printing the new shelf tag using the printer.

11. The method according to claim 10, further comprising receiving information for a scanned Global Trade Item Number (GTIN) or a scanned Universal Product Code (UPC) of the product of the manufacturer before the obtaining of the stored price.

12. The method according to claim 10, further comprising sending price information for the scanned shelf tag and the stored price to the hand-held, portable terminal for displaying thereon.

13. The method according to claim 10, wherein
the received location data is obtained via location tracking circuitry comprising Zigbee technology, Bluetooth technology, GPS, or wireless location technology within the store.

14. The method according to claim 10, further comprising sending stored planogram information to the hand-held, portable terminal for displaying thereon for determining placement for the product.

15. A method of verifying prices displayed on tags and locations for products on a shelf that are carried by a retailer or a store, using a hand-held portable terminal comprising a display, the method comprising:
scanning, by the hand-held, portable terminal, a tag barcode provided on a tag affixed to a shelf of the retailer or the store, the tag being associated with a product of a manufacturer and the tag barcode comprising: an encoded identifier and price information for the associated product embedded therein;
scanning a Global Trade Item Number (GTIN) or a Universal Product Code (UPC) of the product of the manufacturer;
determining location data of the scanned tag barcode and of the product via determining a location of the hand-held portable terminal within the retailer or the store using location tracking circuitry provided within the hand-held, portable terminal;
receiving a stored price associated with the GTIN or UPC of the product from a store server;
receiving stored planogram data associated with the product after scanning the tag barcode;
comparing, at the portable terminal, (a) the stored price for the product to the price information of the scanned tag barcode and determining a price inconsistency between the stored price for the product and the price information of the scanned tag barcode based on the comparison and (b) the stored planogram data for the product and the determined location data for the product and determining a planogram inconsistency for the product between planogram data and the determined location data based on the comparison;
issuing an alert, using the hand-held, portable terminal, as a result of the determined price inconsistency and the determined planogram inconsistency for the product;
issuing a command, as a result of the determined price inconsistency, from the portable terminal to a printer to print a new shelf tag including a new tag barcode comprising: the encoded identifier and the stored price; and
printing the new shelf tag using the printer,
wherein the alert is provided in the form of (a) an audio alarm via a sound device and/or (b) vibrations via a vibration device, that is within the hand-held, portable terminal.

16. The method according to claim 15, further comprising receiving the price information for the scanned tag barcode from the store server before the comparing.

17. The method according to claim 16, further comprising receiving price information for the scanned shelf tag and the stored price from the store server for displaying via its display.

18. The method according to claim 15, wherein
the determined location data is obtained via location tracking circuitry comprising Zigbee technology, Bluetooth technology, GPS, or wireless location technology within the retailer or the store.

19. The method according to claim 15, further comprising receiving stored planogram information to the hand-held, portable terminal for displaying on its display for determining placement for the product.

20. The method according to claim 1, wherein the determining of the location data of the hand-held, portable terminal, further comprises using the hand-held, portable terminal for:
   scanning a barcode associated with an aisle within the retailer or store, and
   scanning a code associated with a particular shelf within the aisle,
   to further determine the determined location of the scanned tag barcode and the determined product, for use in the comparison of the stored planogram data and the determined location data.

* * * * *